(12) United States Patent
Lee et al.

(10) Patent No.: US 10,778,964 B2
(45) Date of Patent: Sep. 15, 2020

(54) METHOD AND APPARATUS FOR CONTROLLING STEREOSCOPIC 3D IMAGE IN VEHICLE

(71) Applicants: Hyundai Motor Company, Seoul (KR); Kia Motors Corporation, Seoul (KR)

(72) Inventors: Hyung Seok Lee, Seoul (KR); Ju Hyuk Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/995,344

(22) Filed: Jun. 1, 2018

(65) Prior Publication Data
US 2019/0191149 A1 Jun. 20, 2019

(30) Foreign Application Priority Data
Dec. 20, 2017 (KR) .................. 10-2017-0175856

(51) Int. Cl.
*H04N 13/383* (2018.01)
*H04N 13/332* (2018.01)
*H04N 13/302* (2018.01)
*H04N 13/378* (2018.01)
*H04N 13/371* (2018.01)

(52) U.S. Cl.
CPC ......... *H04N 13/383* (2018.05); *H04N 13/302* (2018.05); *H04N 13/332* (2018.05); *H04N 13/371* (2018.05); *H04N 13/378* (2018.05)

(58) Field of Classification Search
CPC ............ G02B 27/2214; G02B 27/2242; G02B 3/005; G02B 3/0062; G06F 3/012; G06F 3/0304; G06F 3/0325; G06F 3/04842; G06F 3/04897; G06K 9/0061; G06K 9/00335; G06K 9/00597; G06K 9/4671; G06K 9/481; H04N 13/128; H04N 13/302; H04N 13/305; H04N 13/349; H04N 13/354; H04N 13/359; H04N 13/373; H04N 13/376; H04N 13/378; H04N 13/38; H04N 13/332; H04N 13/371; H04N 13/383; A61B 3/113
USPC ........................... 348/46, 51; 345/6, 87, 419
See application file for complete search history.

(56) References Cited

U.S. PATENT DOCUMENTS

| 9,898,080 B2 * | 2/2018 | Kang ................. G06K 9/00597 |
| 2006/0098093 A1 | 5/2006 | Hahn et al. |
| 2008/0225118 A1 * | 9/2008 | Suzuki ................. B60R 25/302 348/148 |

(Continued)

FOREIGN PATENT DOCUMENTS

| JP | 2010-179034 A | 8/2010 |
| JP | 2014-092965 A | 5/2014 |

(Continued)

*Primary Examiner* — Nathnael Aynalem
(74) *Attorney, Agent, or Firm* — Morgan, Lewis & Bockius LLP (57) ABSTRACT

A method of controlling a vehicle display apparatus may include generating a user image as information on a user sitting on a seat corresponding to the display apparatus, extracting a midpoint between two eyes of the user from the user image and monitoring a position of the midpoint, and changing an output mode or an output area of the display apparatus in correspondence with the monitored position of the midpoint.

20 Claims, 7 Drawing Sheets

(56) References Cited

U.S. PATENT DOCUMENTS

| | | | | |
|---|---|---|---|---|
| 2009/0304232 | A1* | 12/2009 | Tsukizawa | A61B 3/113 |
| | | | | 382/103 |
| 2013/0076735 | A1* | 3/2013 | Lee | G09G 3/003 |
| | | | | 345/419 |
| 2014/0152926 | A1* | 6/2014 | Takahashi | G02B 27/2214 |
| | | | | 349/15 |
| 2014/0192033 | A1* | 7/2014 | Hsu | G06F 3/013 |
| | | | | 345/207 |
| 2015/0156480 | A1* | 6/2015 | Hamagishi | G09G 3/3406 |
| | | | | 348/51 |
| 2016/0065954 | A1* | 3/2016 | Son | G02B 27/225 |
| | | | | 348/51 |
| 2016/0272217 | A1 | 9/2016 | Kim et al. | |
| 2016/0335475 | A1* | 11/2016 | Krenzer | G06K 9/00335 |

FOREIGN PATENT DOCUMENTS

| | | |
|---|---|---|
| KR | 10-1628394 B1 | 6/2016 |
| KR | 10-2017-0103708 A | 9/2017 |

\* cited by examiner

METHOD AND APPARATUS FOR CONTROLLING STEREOSCOPIC 3D IMAGE IN VEHICLE

The present application claims priority to Korean Patent Application No. 10-2017-0175856, filed on Dec. 20, 2017, the entire contents of which is incorporated herein for all purposes by this reference.

BACKGROUND OF THE INVENTION

Field of the Invention

The present invention relates to a method and apparatus configured for controlling a stereoscopic three-dimensional image in a vehicle and, more particularly, to a vehicle display apparatus capable of outputting a stereoscopic three-dimensional image and converting a stereoscopic three-dimensional (3D) image, which may cause inconvenience to a user, into a planar two-dimensional (2D) image and displaying the planar 2D image, and a method of controlling the same.

Description of Related Art

A three-dimensional (3D) image may mean a stereo image and may be referred to as a stereo image, a 3D image or a stereoscopic 3D image. A person is accustomed to 3D space and may recognize a stereoscopic image due to binocular disparity. This is referred to as a stereoscopic vision. When a person looks at something, a 2D image seen by the left eye and a 2D image seen by the right eye differ. The two-dimensional images of the same object or area seen by the eyes are different in terms of perspective or vanishing point. When the two different two-dimensional images are delivered to the brain, one stereoscopic image may be recognized.

When a person looks at an object close to the eyes thereof, the background behind the object appears to be two. In contrast, when the person focuses on the background, the object located in front of the eyes appears to be two. This is because the focal length is different. The angles of the pupils change naturally, which is referred to as convergence. When such information is simultaneously delivered to the brain, the information is processed in the brain and the object is stereoscopically recognized.

A three-dimensional image may be displayed using an active method or a passive method according to a method of respectively allowing images to be viewed by corresponding eyes. In these modes, by allowing the images to be respectively recognized by the left and right eyes of a user without being mixed, it is possible to prevent a crosstalk phenomenon in which the two images of an object are superimposed.

In the active method, a display apparatus alternately displays screens corresponding to the left and right cameras at a very high speed and stereoscopic glasses worn by a viewer may also move. That is, the left glass may be opened and the right glass may be closed such that the screen corresponding to the left camera is visible to only the left eye and the right glass may be opened and the left glass may be closed when the screen of the right camera is output. This mode is advantageous in that the screen may be viewed clearly, but is not suitable for a vehicle display apparatus because a technique for matching movement of a TV and the glasses is required.

In the passive method, a display apparatus may simultaneously display left and right images on one screen. However, when the left and right images are simultaneously displayed, information to be transmitted to the left and right eyes may not be distinguished and thus may not be stereoscopically recognized. Therefore, a polarization filter needs to be attached to the display apparatus. Since information to be transmitted to the left eye is transmitted to the left eye and information to be transmitted to the right eye is transmitted to the right eye through the polarization filter, a user does not need to wear a tool such as glasses.

However, a conventional three-dimensional image provided to a driver does not consider movement or position of the driver or change in surrounding environment. For example, when the driver views an image slightly below or above a display screen, a crosstalk phenomenon in which images are superimposed may occur. This is because an image which should not be visible to each eye is visible due to an angle of view and this phenomenon may become severe as a distance is decreased. In this case, the driver may feel dizzy, thereby hindering safe driving.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and apparatus configured for controlling a stereoscopic 3D image in a vehicle that substantially obviate one or more problems due to limitations and disadvantages of the related art.

Various aspects of the present invention are directed to providing an apparatus and method configured for converting a stereoscopic 3D image into a 2D image and outputting the 2D image when a display apparatus mounted in a vehicle monitors the position of a driver or a user and, more particularly, the position of an area between eyebrows and determines that the position of the driver or the user is outside of a predetermined range.

Various aspects of the present invention are directed to providing an apparatus and method configured for selectively displaying a stereoscopic three-dimensional image or a planar two-dimensional image by allowing a display apparatus mounted in a vehicle to detect the gaze of a driver or user of the apparatus and automatically switching an output mode in correspondence with the gaze.

Various aspects of the present invention are directed to providing a method and apparatus configured for reducing inconvenience of a user who utilizes a display apparatus, by predetermining or collecting data on the position of a driver or user riding in a vehicle, the position of an area between eyebrows and the gaze of the driver or user, establishing a database of the driver or user, and utilizing the database to output a two-dimensional image or a three-dimensional image through the display apparatus mounted in a vehicle.

The technical problems solved by the present invention are not limited to the above technical problems and other technical problems which are not described herein will become apparent to those skilled in the art from the following description.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

To achieve these objects and other advantages and in accordance with the purpose of the present invention, as embodied and broadly described herein, a method of controlling a vehicle display apparatus may include generating a user image as information on a user sitting on a seat corresponding to the display apparatus, extracting a midpoint between two eyes of the user from the user image and monitoring a position of the midpoint, and changing an output mode or an output area of the display apparatus in correspondence with the monitored position of the midpoint.

Furthermore, the display apparatus may be a cluster of the vehicle and the user may be a driver.

Furthermore, the user image may be generated through a camera disposed in the cluster and the camera may operate when the vehicle is powered on.

Furthermore, the camera may have an angle of view within which the contour of the face of the driver may be included in an image in correspondence with a distance between the cluster and the seat. Furthermore, to recognize two eyes in the contour of the face, the image output from the camera may have resolution of at least 32 to 60 pixels between two eyes. Furthermore, in the user image generated through the camera apparatus, the entire face may have at least 64 grayscales or color values.

The monitoring of the position of the midpoint may include recognizing a contour of a face from the user image, recognizing the two eyes in the contour, and monitoring the position of the midpoint between the two eyes.

The monitoring of the position of the midpoint between the two eyes may include setting a first point and a second point at positions of the two eyes closest to each other and setting an intermediate point between the first point and the second point as the midpoint.

The monitoring of the position of the midpoint between the two eyes may include recognizing both end portions of each of the two eyes, setting an intermediate point between both the end portions of each of the two eyes as a first point and a second point, and setting an intermediate point between the first point and the second point as the midpoint.

The monitoring of the position of the midpoint may further include monitoring a tilt of an axis connecting the two eyes.

The monitoring of the position of the midpoint may further include estimating the midpoint from data on the user using the contour when the two eyes are not recognized.

The changing of the output mode or the output area of the display apparatus may include comparing a current position with a previous position of the midpoint to determine a position change value and adjusting a value of a polarization filter of the display apparatus in correspondence with the position change value.

The display apparatus may output two different images, and the polarization filter may respectively transmit the two images to the two eyes of the user.

The changing of the output mode or the output area of the display apparatus may include the polarization filter blocking one of the two images if the current position is outside of a predetermined range, and the polarization filter respectively transmitting the two images to the two eyes of the user if the current position is within the predetermined range.

The predetermined range may be individually set with respect to a horizontal direction, a vertical direction and a rotation direction.

The output mode may include a first mode for outputting a stereoscopic three-dimensional image and a second mode for outputting a stereoscopic two-dimensional image, and the first mode and the second mode may be automatically switched in correspondence with the position of the midpoint.

The display apparatus may include at least one of a multimedia device configured for providing multimedia content to a user or a navigation device configured for providing information on a map or a traveling route to the user.

In the instant case, the user image may be generated through the camera disposed in the multimedia device or the navigation device. The camera may operate when the seat belt of the seat is fastened or when presence of the user is confirmed through the pressure sensor disposed in a seat.

According to various aspects of the present invention, an apparatus configured for controlling a vehicle display apparatus may include a camera apparatus configured for generating a user image of a user sitting on a seat corresponding to the display apparatus, a position determination device configured for extracting a midpoint between two eyes of the user from the user image and monitoring a position of the midpoint, and a controller for changing an output mode or an output area of the display apparatus in correspondence with the monitored position of the midpoint.

The camera apparatus may be disposed in a center area of the display apparatus in a left-and-right direction thereof.

Furthermore, the display apparatus may be a cluster of the vehicle and the user may be a driver.

Furthermore, the user image may be generated through a camera disposed in the cluster and the camera may operate when the vehicle is powered on.

Furthermore, the camera may have an angle of view within which the contour of the face of the driver may be included in an image in correspondence with a distance between the cluster and the seat. Furthermore, to recognize two eyes in the contour of the face, the image output from the camera may have resolution of at least 32 to 60 pixels between two eyes. Furthermore, in the user image generated through the camera apparatus, the entire face may have at least 64 grayscales or color values.

The position determination device may recognize a contour of a face from the user image, recognize the two eyes in the contour, and monitor the position of the midpoint between the two eyes.

The position determination device may set a first point and a second point at positions of the two eyes closest to each other and set an intermediate point between the first point and the second point as the midpoint.

The position determination device may recognize both end portions of each of the two eyes, set an intermediate point between both the end portions of each of the two eyes as a first point and a second point, and set an intermediate point between the first point and the second point as the midpoint.

The position determination device may monitor a tilt of an axis connecting the two eyes.

The position determination device may estimate the midpoint from data on the user using the contour when the two eyes are not recognized.

The controller may compare a current position with a previous position of the midpoint to determine a position change value and adjust a value of a polarization filter of the display apparatus in correspondence with the position change value.

The display apparatus may output two different images, and the polarization filter may respectively transmit the two images to the two eyes of the user.

The controller may perform control such that the polarization filter blocks one of the two images if the current position is outside of a predetermined range and the polarization filter respectively transmits the two images to the two eyes of the user if the current position is within the predetermined range.

The output mode may include a first mode for outputting a stereoscopic three-dimensional image and a second mode for outputting a stereoscopic two-dimensional image.

The controller may automatically switch between the first mode and the second mode in correspondence with the position of the midpoint.

The display apparatus may include at least one of a multimedia device configured for providing multimedia content to a user or a navigation device configured for providing information on a map or a traveling route to the user.

Furthermore, the user image may be generated through the camera disposed in the multimedia device or the navigation device. The camera may operate when the seat belt of the seat is fastened or when presence of the user is confirmed through the pressure sensor disposed in a seat.

According to various aspects of the present invention, a vehicle cluster may include a panel for displaying at least one symbol, text, number or image configured for displaying status information related to a vehicle, a polarization film for converting the at least one symbol, text, number or image displayed through the panel into one of a stereoscopic three-dimensional image or a planar two-dimensional image, and a controller for controlling the polarization film in correspondence with a position of a driver.

Furthermore, the position of the driver may be determined based on a midpoint between two eyes of the driver, and the vehicle cluster may further include a camera apparatus configured for detecting and monitoring a position of the midpoint.

The aspects of the present invention are only a portion of the exemplary embodiments of the present invention, and various embodiments based on technical features of the present invention may be devised and understood by a person with ordinary skill in the art based on the detailed description of the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an apparatus and various methods, to which the exemplary embodiments of the present invention are applied, will be described in detail with reference to the accompanying drawings. The suffixes "module" and "unit" of elements herein are used for convenience of description and thus may be used interchangeably and do not have any distinguishable meanings or functions.

In the following description of the embodiments, it will be understood that, when each element is referred to as being formed "on" or "under" the other element, it may be directly "on" or "under" the other element or be indirectly formed with one or more intervening elements therebetween. Furthermore, it will also be understood that "on" or "under" the element may mean an upward direction or a downward direction of the element.

In the exemplary embodiment of the present invention, when a cluster displays a stereoscopic image or picture to a driver, the changed position of the driver (e.g., a midpoint between two eyes or an area between eyebrows) may be monitored using a camera (e.g., a CCD camera, an infrared camera, etc.). The real-time monitored position of the driver may be compared to a pre-stored profile or database (DB) including various user conditions and a stereoscopic 3D image or picture may be automatically converted into or changed to a planar 2D image or picture when a difference between two values exceeds a limit, preventing the driver or user from feeling dizzy.

Figure 1:
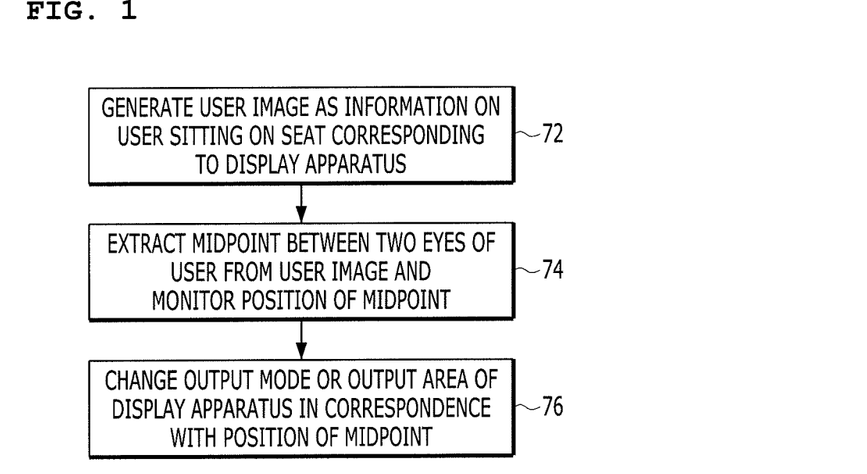
FIG. 1 is a view illustrating a first example of a method of controlling a vehicle display apparatus.

FIG. 1 is a view illustrating a first example of a method of controlling a vehicle display apparatus.

As shown in the figure, the method of controlling the vehicle display apparatus may include step 72 of generating a user image as information on a user sitting on a seat corresponding to the display apparatus, step 74 of extracting a midpoint between the two eyes of the user from the user image and monitoring the position of the midpoint, and step 76 of changing an output mode or output area of the display apparatus in correspondence with the monitored position of the midpoint.

In various exemplary embodiments of the present invention, the display apparatus may be a vehicle cluster. The vehicle cluster may selectively display a stereoscopic 3D image or picture or a planar 2D image or picture in correspondence with the position of the driver.

The position of the user needs to be collected, for the vehicle cluster to selectively display the stereoscopic 3D image or picture or the planar 2D image or picture. The position of the user may be collected and monitored through a camera disposed on the vehicle cluster. Such a camera may operate when the vehicle is powered on.

To recognize the user's face and to determine the positions of or a midpoint between the eyes of the user, the camera needs to satisfy predetermined conditions. For example, the camera for detecting the position of the user (e.g., a midpoint between two eyes or an area between eyebrows) may have a view angle at which the contour of the face of the driver may be included in the image in correspondence with a distance between the cluster, which is the display apparatus, and the driver's seat. to recognize two eyes in the contour of the face through the collected image, the image generated by the camera needs to have resolution of at least 32 to 60 pixels between two eyes. Furthermore, in the user image generated through the camera apparatus, the entire face may have at least 64 grayscales or color values.

Meanwhile, in various exemplary embodiments of the present invention, the display apparatus may include at least one of a multimedia device configured for providing multimedia content to a user or a navigation device configured for providing information on a map or a traveling route to the user. If the vehicle display apparatus used by the passenger of the vehicle can output a stereoscopic 3D image or picture, a crosstalk phenomenon may occur according to the position of the user who utilizes the vehicle display apparatus. In the instant case, since the user of the vehicle may feel dizzy, control may be performed such that the image or picture output from the vehicle display apparatus is viewed by the user in the stereoscopic 3D format or the planar 2D format in correspondence with the position of the user.

Information for detecting the position of the user may be generated through the camera disposed in the vehicle display apparatus, such as a vehicle multimedia device or a navigation device. At the present time, the camera may operate when a seat belt of a seat, on which a user sits, is fastened or upon determining that a user is present through a pressure sensor disposed in a seat. Furthermore, in various exemplary embodiments of the present invention, the camera may operate when the vehicle display apparatus is turned on.

Figure 2A:
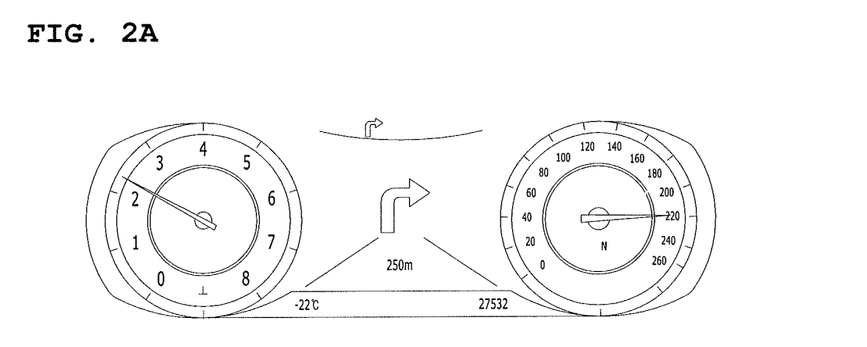
FIG. 2A and FIG. 2B are views illustrating an image or a picture displayed on a vehicle cluster.
Figure 2B:
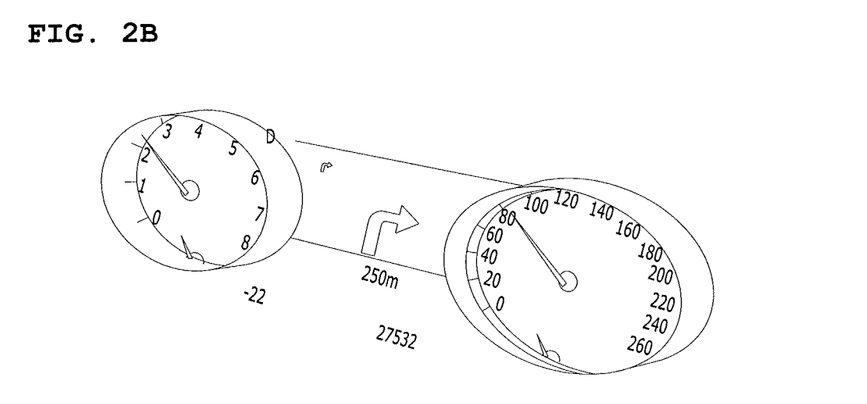

FIGS. 2A and 2B are views illustrating an image or a picture displayed on a vehicle cluster. Specifically, FIG. 2A shows a vehicle cluster for displaying a planar two-dimensional image or picture and FIG. 2B shows a vehicle cluster for displaying a stereoscopic three-dimensional image or picture. A driver or a user may view any one of the planar two-dimensional image or picture and the stereoscopic three-dimensional image or picture described with reference to FIGS. 2A and 2B in correspondence with the position thereof.

Referring to FIGS. 2A and 2B, the vehicle cluster may include a panel for displaying at least one symbol, text, number or image configured for displaying the status information related to the vehicle, a polarization film for converting at least one symbol, text, number or image displayed through the panel into any one of a stereoscopic three-dimensional image or a planar two-dimensional image, and a controller for controlling the polarization film in correspondence with the position of the driver. Here, the polarization film may be disposed on the panel. The panel may output a stereoscopic three-dimensional image or picture, and the panel and the polarization film may operate similarly to a display apparatus using a passive method. However, unlike the display apparatus using the passive method, the polarization film of the vehicle cluster may be controlled in correspondence with the position of the driver or the user.

The position of the driver may be determined based on the midpoint between the eyes of the driver or the user. To this end, although not shown, the vehicle cluster may further include a camera apparatus configured for detecting and monitoring the position of the midpoint.

In various exemplary embodiments of the present invention, the cluster configured for displaying the stereoscopic three-dimensional image or picture may acquire the facial image and position information related to the driver using the camera, determine the current position of the face, and adjust the polarization film (barrier) included in the cluster to suit the driver based on data acquired from the image. By tracking the facial image of the driver or the user and adjusting the polarization film (barrier), it is possible to display the stereoscopic 3D image or picture to the driver.

Referring to FIGS. 2A and 2B, the output mode of the vehicle cluster may include a first mode for outputting a stereoscopic three-dimensional image and a second mode for outputting a stereoscopic two-dimensional image. The first mode and the second mode may be automatically switched in correspondence with the position of the midpoint used as the position of the user.

Figure 3:
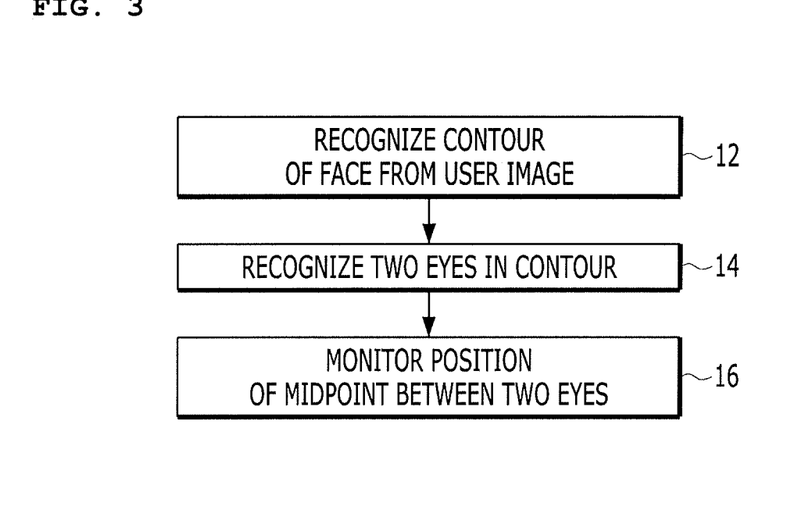
FIG. 3 is a view illustrating a method of monitoring the position of a midpoint.

FIG. 3 is a view illustrating a method of monitoring the position of a midpoint.

As shown in the figure, the method of monitoring the position of the midpoint may include step 12 of recognizing the contour of the face from the user image, step 14 of recognizing two eyes in the contour, and step 16 of monitoring the position of the midpoint of the two eyes.

To output a stereoscopic three-dimensional image or a planar two-dimensional image, when the contour of the face is recognized through the user image, the positions of the two eyes of the face may be detected and the midpoint between the two eyes may be monitored.

In various exemplary embodiments of the present invention, step 16 of monitoring the position of the midpoint between the two eyes may include setting a first point and a second point at positions of the two eyes closest to each other and setting an intermediate point between the first point and the second point as a midpoint. The sizes and shapes of the eyes of persons may differ but the eyes may be clearly distinguished from the other parts (e.g., nose, mouth, etc.) of the face. Accordingly, when the contour of the face is recognized from the user image and then the two eyes in the face are recognized, a midpoint between the positions of the two eyes closest to each other may be set.

Meanwhile, to more accurately set the positions of the eyes of the user as reference points, in various exemplary embodiments of the present invention, step 16 of monitoring the position of the midpoint between the two eyes may include recognizing both end portions of each of the two eyes, setting a midpoint between both end portions of each of the two eyes as a first point and a second point, and setting an intermediate point between the first point and the second point as a midpoint. Upon assuming that the pupils of the two eyes are located at the center of the eye, it is possible to more accurately track the gaze of the driver using the set midpoint.

Although not shown, step 16 of monitoring the position of the midpoint between the two eyes may further include monitoring the slope of an axis connecting the two eyes. The reason why the slope of the axis is monitored is because the driver or the user may tilt the head or gaze thereof while driving the vehicle without movement of the body of the user in left, right, upward and downward directions thereof. Since a crosstalk phenomenon may occur even when the gaze of the user is tilted, a stereoscopic 3D image may be converted into a planar 2D image when the gaze of the user is tilted by a predetermined value or more.

Step 16 of monitoring the position of the midpoint between the two eyes may further include estimating the midpoint from the data on the user using the contour when the two eyes are not recognized. It may be difficult to accurately detect the two eyes in the contour of the face due to the hair style of the driver or the user or presence/absence of glasses. In the instant case, it is possible to estimate the midpoint based on the contour of the face of the user image. When it is difficult to recognize the two eyes based on the image of the image of the driver or the user, the midpoint may be estimated from the contour of the face (e.g., the width of the face, the chin, etc.) based on the record of the facial contour and the midpoint, determining the position of the user.

For example, if there is an object covering the whole or portion of the face of the driver or the left/right eye of the driver is not detected, a virtual midpoint may be generated in a portion recognized as a face according to the width of the face based on a learning database or a user profile and may be used as the position of the currently recognized user. In the instant case, a confidence level method may be applied using a value obtained by comparing a midpoint coordinate with a predetermined range (boundary condition) determining the position of the user. For example, if a confidence level is equal to or less than 50%, it may be determined that the position of the user is not suitable for viewing of the stereoscopic three-dimensional image and the stereoscopic three-dimensional image may be converted into a planar two-dimensional image.

Figure 4A:
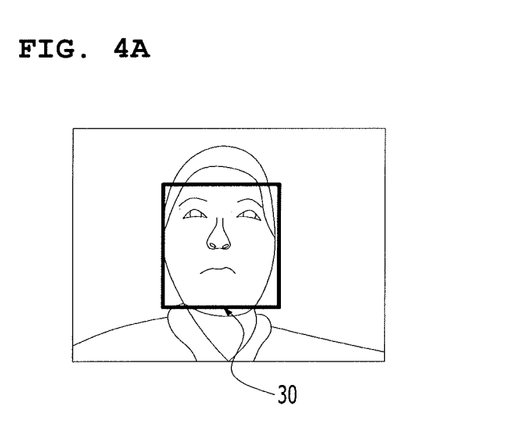
FIG. 4A and FIG. 4B are views illustrating an example of recognizing a midpoint from a user image.
Figure 4B:
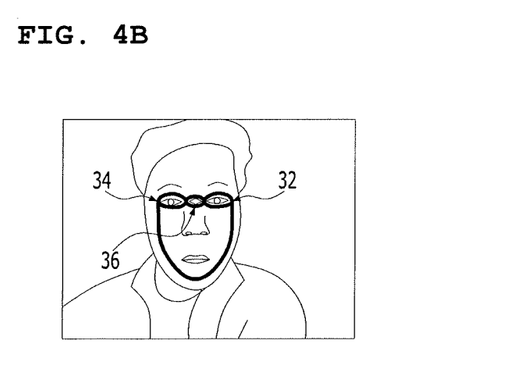

FIG. 4 are views illustrating an example of recognizing a midpoint from a user image.

Referring to FIG. 4A, when a user or a driver rides in a vehicle and powers the vehicle on, a camera may operate to extract an image of the driver.

Referring to FIG. 4B, after the facial contour 30 of the driver is detected from the extracted image and the two eyes 32 and 34 are detected from the face, a midpoint 36 between the two eyes 32 and 34 may be determined. Such a midpoint 36 may be used to control the polarization film of a vehicle cluster or a multimedia device.

Figure 5:
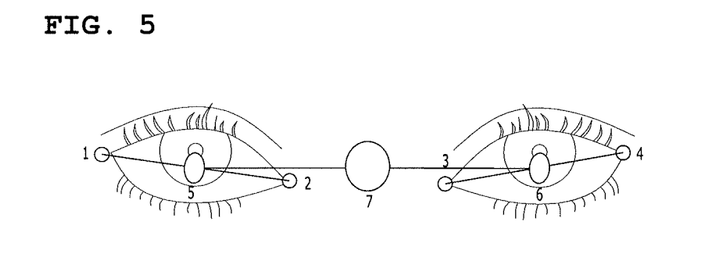
FIG. 5 is a view illustrating a method of determining a midpoint.

FIG. 5 is a view illustrating a method of determining a midpoint.

As shown in the figure, when the two eyes are recognized, both end portions 1 and 2 of one eye and both end portions 3 and 4 of the other eye may be detected from the image. Thereafter, the intermediate position between both end portions of each eye may be determined. For example, the intermediate position 5 between the end portions 1 and 2 of one eye and the intermediate position 6 between the end portions 3 and 4 of the other eye may be determined. The intermediate position between the two intermediate positions 5 and 6 may be determined as the midpoint 7.

Meanwhile, in various exemplary embodiments of the present invention, to extract the midpoint between the two eyes of the user or the driver, two points of the left and right end portions of the left eye and two points of the left and right end portions of the right eye may be extracted and an intermediate point therebetween may be determined as a midpoint.

Figure 6:
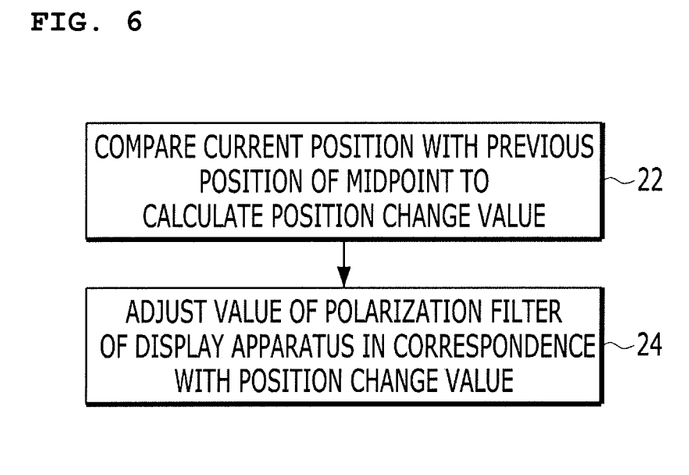
FIG. 6 is a view illustrating a method of changing an output mode or output area of a display apparatus.

FIG. 6 is a view illustrating a method of changing an output mode or output area of a display apparatus.

As shown in the figure, the method of changing the output mode or the output area of the display apparatus may include step 22 of comparing a current position with a previous position of a midpoint to determine a position change value and step 24 of adjusting a value of a polarization filter of the display apparatus.

To output a stereoscopic three-dimensional (3D) image, the display apparatus may output two different images and a polarization filter disposed on the display apparatus may be designed to respectively transmit the two images to the two eyes of a user.

Figure 7A:
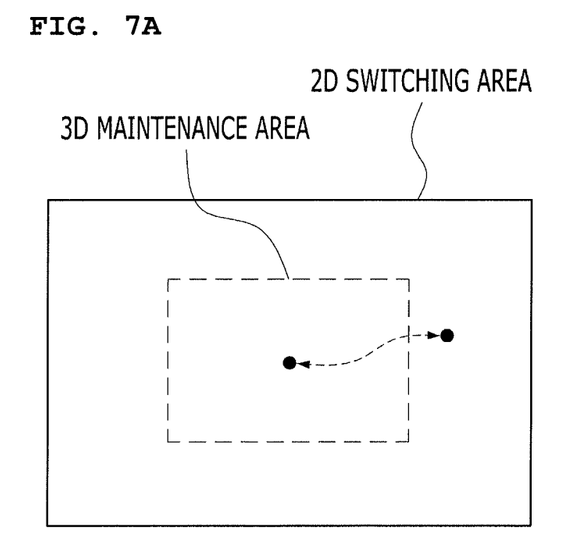
FIG. 7A and FIG. 7B are views illustrating switching of a two-dimensional (2D) and three-dimensional (3D) image or picture.
Figure 7B:
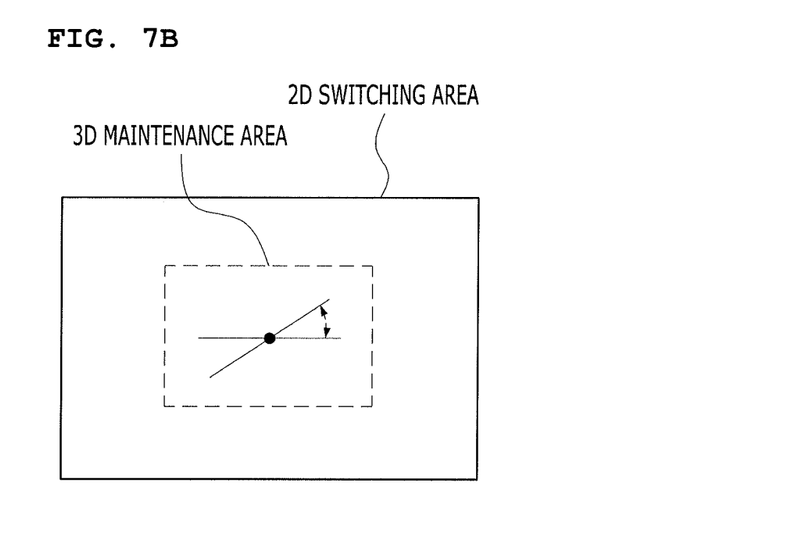

FIG. 7 are views illustrating switching of a two-dimensional (2D) and three-dimensional (3D) image or picture. Specifically, FIG. 7A illustrates the case where the position of the user is outside of a range of left, right, up and down, and FIG. 7B illustrates the case where the position of the user is within a predetermined range but is outside of a range of a rotation direction thereof.

The position of the user or the driver may be determined through the camera disposed in the vehicle display apparatus and may be tracked as one point as shown in FIGS. 7A and 7B. The range within which the position of the user or the driver may be recognized through the camera may include a 3D maintenance area in which the user or the driver may recognize a stereoscopic three-dimensional image or picture without inconvenience and a 2D switching area in which a planar two-dimensional image or picture may be provided because the user or the driver may feel discomfort due to a crosstalk phenomenon.

Referring to FIG. 7A, when the position of the user is moved from the 3D maintenance area to the 2D switching area and vice versa, the vehicle display apparatus may convert the stereoscopic 3D image into the planar 2D image and vice versa.

Furthermore, referring to FIG. 7B, when the position of the user is in the 3D maintenance area but an axis between the two eyes is outside of a predetermined range, the vehicle display apparatus may convert the stereoscopic 3D image into the planar 2D image and vice versa.

Here, the predetermined range may be individually set with respect to a horizontal direction, a vertical direction and a rotation direction of a predetermined point.

Figure 8:
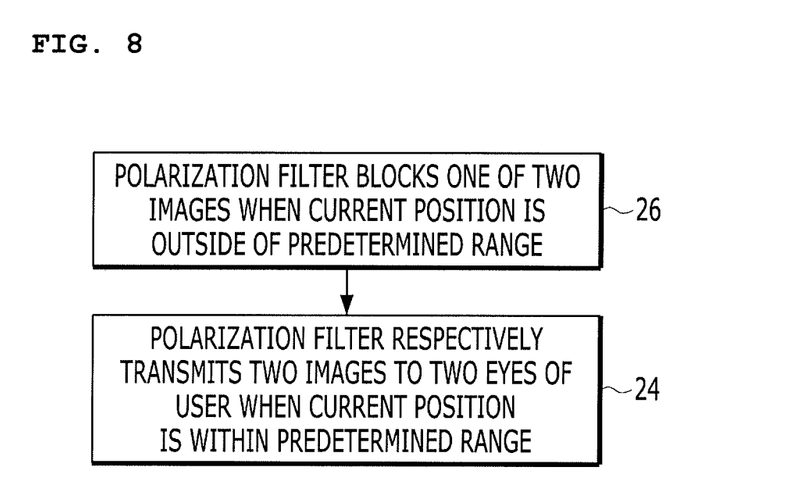
FIG. 8 is a view illustrating an image switching method.

FIG. 8 is a view illustrating an image switching method.

As shown in the figure, the image switching method for changing the output mode of the display apparatus may further include step 26 of blocking one of two images through a polarization filter when a current position is outside of a predetermined range and step 24 of respectively transmitting the two images to the two eyes of the user through the polarization filter when the current position enters the predetermined range. To convert the stereoscopic 3D image output from the vehicle display apparatus into the planar 2D image and vice versa, the polarization filter may be controlled to block the image transmitted to one of the two eyes and, when the image transmitted to one eye is blocked, the user may recognize information transmitted by the vehicle display apparatus through the planar 2D image.

Figure 9A:
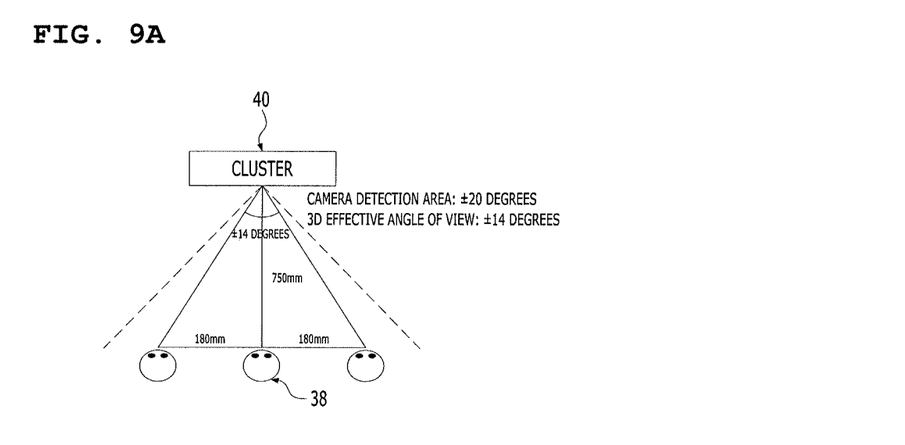
FIG. 9A and FIG. 9B are views illustrating a condition related to horizontal and vertical movement of a user.
Figure 9B:
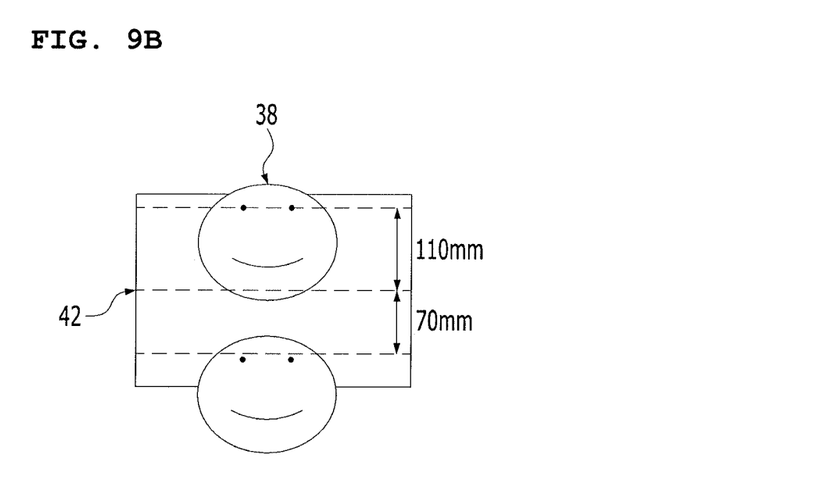

FIGS. 9A and 9B are views illustrating a condition related to horizontal and vertical movement of a user.

As shown in the figure, if an extracted midpoint coordinate (user position) is outside of a range of an effective angle of view (boundary condition) of the stereoscopic three-dimensional image or picture, it may be determined that the user or the driver 38 may feel dizzy due to crosstalk and the stereoscopic three-dimensional (3D) image may be converted into the planar two-dimensional (2D) image.

For example, referring to FIG. 9A, the position of the user or the driver 38 is moved to the left or right. Upon assuming that the distance between the user or the driver 38 and the vehicle cluster 40 is 750 mm, if the effective angle of view of the stereoscopic three-dimensional image is ±14 degrees, and the user or the driver 38 is moved to the left or right in a range of 180 mm, it may be determined that dizziness caused due to crosstalk is not large. Meanwhile, the detection area (e.g., ±20 degrees) of the camera apparatus configured for detecting movement of the user or the driver 38 may be greater than the effective angle of view (e.g., ±14 degrees) of the stereoscopic three-dimensional image.

Furthermore, referring to FIG. 9B, the position of the user or the driver 38 is moved in the upper or lower direction thereof. As in the 3D maintenance area or the 2D switching area described in FIGS. 7A and 7B, the range 42 of the upward or downward direction of the user or the driver 38 may be set. In various exemplary embodiments of the present invention, when the position of the user or the driver 38 is moved from a center position upward by 100 mm or downward by 70 mm, the stereoscopic three-dimensional image or the planar two-dimensional image may be output.

Figure 10A:
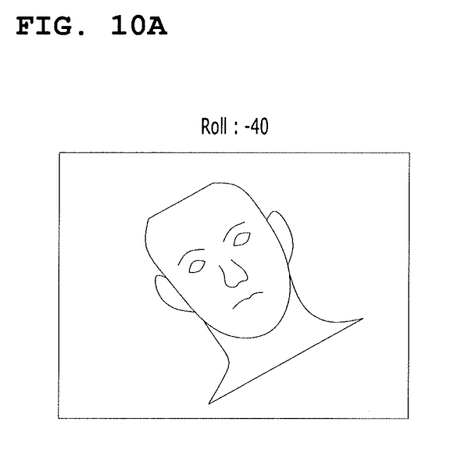
FIG. 10A and FIG. 10B are views illustrating a condition related to rotation of a user.
Figure 10B:
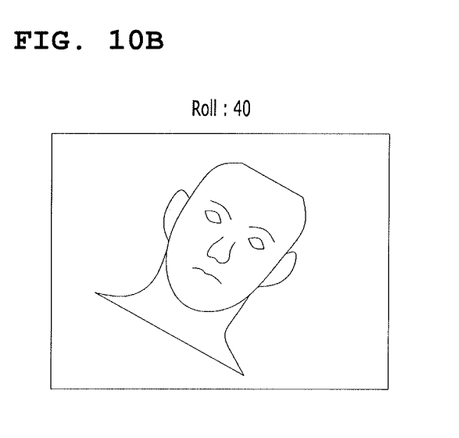

FIGS. 10A and 10B are views illustrating a condition related to rotational movement of a user.

With respect to the position of the user, inclination of the head of the user may be detected based on the axis connecting the two eyes, for example, an intermediate point of a line connecting the midpoint between the two points of the left and right end portions of the left eye and the midpoint between the two points of the left and right end portions of the right eye.

As shown in FIGS. 10A and 10B, the inclination of the head of the driver may be 40 degrees in a counterclockwise or clockwise direction thereof. If the inclination of the head of the driver exceeds 40 degrees, it may be determined that the driver feels dizzy due to crosstalk and the stereoscopic three-dimensional (3D) image may be converted into the planar two-dimensional (2D) image. Here, 40 degrees is merely exemplary and a threshold may be changed according to the performance of the polarization film of the vehicle display apparatus.

Figure 11:
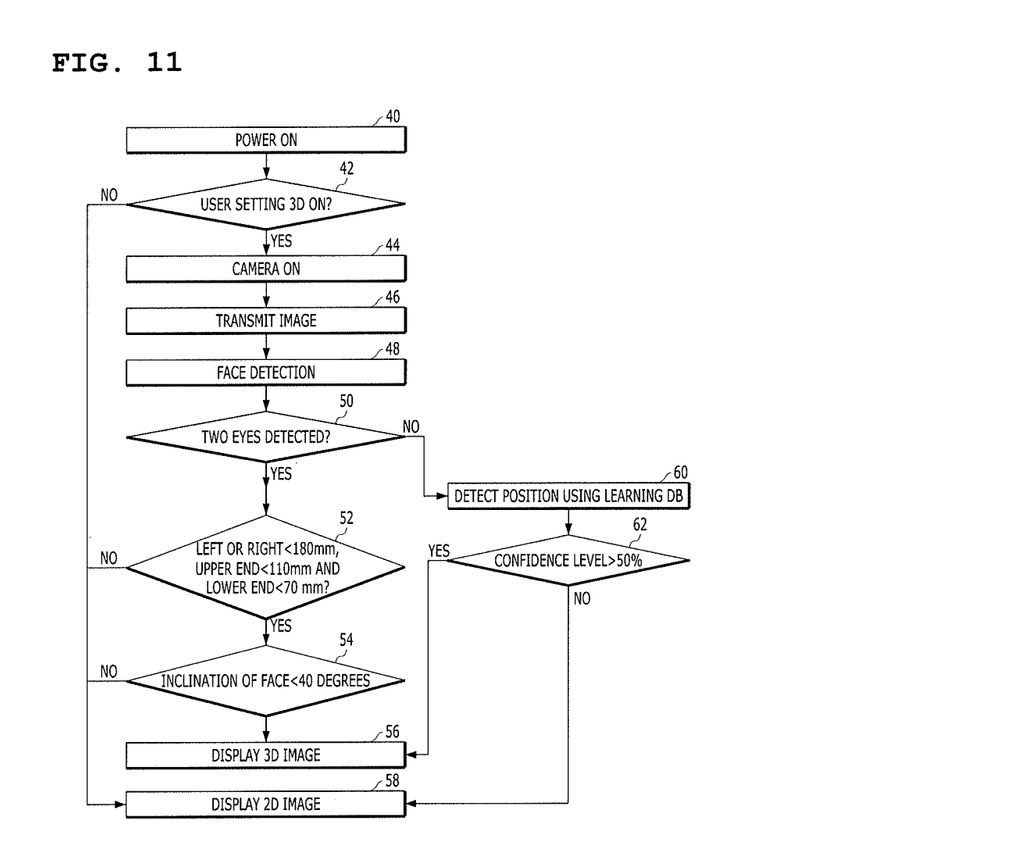
FIG. 11 is a view illustrating a second example of a method of controlling a vehicle display apparatus.

FIG. 11 is a view illustrating a second example of a method of controlling a vehicle display apparatus.

As shown in the figure, in the method of controlling the vehicle display apparatus, after startup at 40, user settings are verified at 42 and a determination as to whether 3D operation or 2D operation is performed is made. For 3D operation, the camera operates ON at 44 to transmit a user image at 46. The facial area of the user or the driver may be detected from the transmitted user image face detection at 48.

Thereafter, when the two eyes are detected at 50, a predetermined area or condition (boundary condition) corresponding to the 3D maintenance area is examined at 52 and the inclination of the face is measured at 54 if the predetermined area or condition is satisfied.

For example, if the inclination of the face is equal to or less than 40 degrees, a 3D image mode is maintained at 56. When the two eyes are not detected, a virtual or estimated position is determined using a user database at to detect the coordinate of the eyes at 60 and, when the detected coordinate is in an area having a confidence level of 50% from the center at 62, a 3D image mode is maintained at 56. If the condition is not satisfied, the 3D image is converted into the 2D image at 58.

Here, the predetermined area or condition may be adjusted according to the vehicle display apparatus mounted in the vehicle and the internal space of the vehicle.

Figure 12:
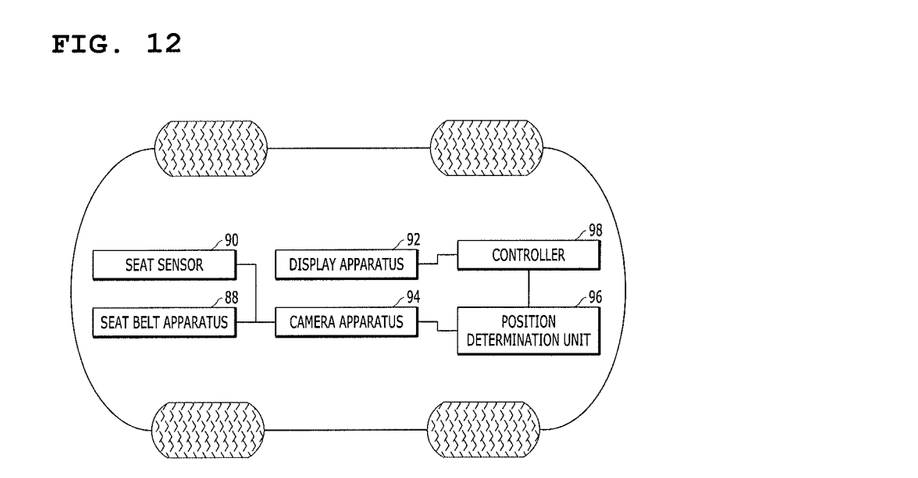
FIG. 12 is a view illustrating an apparatus configured for controlling a vehicle display apparatus.

FIG. 12 is a view illustrating an apparatus configured for controlling a vehicle display apparatus.

As shown in the figure, the apparatus configured for controlling the vehicle display apparatus may include a display apparatus 92 for providing information to a user, a camera apparatus 94 for generating a user image of a user sitting on a seat corresponding to the display apparatus 92, a position determination device 96 for extracting a midpoint between the two eyes of the user from the user image and monitoring the position of the midpoint, and a controller 98 for changing the output mode or the output area of the display apparatus 92 in correspondence with the position of the monitored midpoint.

In various exemplary embodiments of the present invention, the camera apparatus may be disposed in the center area of the display apparatus in the left-and-right direction thereof. However, the camera apparatus needs to detect a range wider than an effective angle of view of a stereoscopic three-dimensional image of the display apparatus 92. In the instant case, the position of the camera apparatus is not limited within the vehicle.

Meanwhile, in various exemplary embodiments of the present invention, the display apparatus may be a vehicle cluster and the user may be a driver. In the instant case, the user image may be generated through the camera disposed in the vehicle cluster. When the vehicle is powered on, the vehicle cluster operates and the camera also operates.

The camera may have an angle of view within which the contour of the face of the driver may be included in an image in correspondence with a distance between the cluster and the seat. Furthermore, to recognize two eyes in the contour of the face, the image output from the camera may have resolution of at least 32 to 60 pixels between two eyes. Furthermore, in the user image generated through the camera apparatus, the entire face may have at least 64 grayscales or color values.

Meanwhile, the position determination device 96 may recognize the contour of the face from the user image, recognize two eyes in the contour and monitor the position of a midpoint between the two eyes. In various exemplary embodiments of the present invention, the position determination device 96 may set a first point and a second point at positions of the two eyes closest to each other and set an intermediate point between the first point and the second point as a midpoint. Furthermore, in various exemplary embodiments of the present invention, the position determination device 96 may recognize both end portions of each of the two eyes, set an intermediate point between both the end portions of each of the two eyes as the first point and the second point, and set an intermediate point between the first point and the second point as a midpoint.

Furthermore, the position determination device 96 may monitor the tilt of the axis connecting the two eyes to determine inclination of the driver.

Furthermore, the position determination device 96 may estimate the intermediate point from the data on the user using the contour when the two eyes are not recognized.

The controller 98 may compare the current position with the previous position of the midpoint to determine a position change value and adjust the value of the polarization filter of the display apparatus in correspondence with the position change value. In various exemplary embodiments of the present invention, the controller 98 may not continuously determine the position change value but determine the position value in correspondence with a predetermined coordinate or map.

The display apparatus 92 may output two different images to implement a stereoscopic three-dimensional image and the polarization filter may be adjusted such that two images are respectively transmitted to the two eyes.

Furthermore, the controller 98 may perform control such that the polarization filter blocks one of the two images when the current position is outside of a predetermined range and such that the polarization filter respectively transmits the two images to the two eyes of the user when the current position is within the predetermined range.

The display apparatus may have a plurality of output modes using a polarization filter. For example, the output mode may include a first mode for outputting a stereoscopic three-dimensional image and a second mode for outputting a stereoscopic two-dimensional image. Here, the controller 98 may automatically switch between the first mode and the second mode in correspondence with the position of the midpoint corresponding to the position of the user.

Meanwhile, in various exemplary embodiments of the present invention, the display apparatus may include at least one of a multimedia device configured for providing multimedia content to a user or a navigation device configured for providing information on a map or a traveling route to the user. In the instant case, the user image may be generated through the camera disposed in the multimedia device or the navigation device. Meanwhile, the camera may operate when the seat belt of the seat is fastened or when presence of the user is confirmed through the pressure sensor disposed in a seat.

In the related art, since the stereoscopic three-dimensional (3D) image provided to the driver does not consider movement or position of the driver or change in surrounding environment, the driver may feel dizzy due to a crosstalk phenomenon in which the screen is doubly viewed. When the vehicle cluster or the vehicle display apparatus displays a stereoscopic 3D image to the user or the driver in the above-described embodiment, the midpoint between the two eyes of the driver or an area between two eyebrows may be monitored using the camera.

Furthermore, when it is difficult to detect the two eyes or the two eyebrows, a value monitored in real time may be compared with a pre-stored database including various user conditions and a stereoscopic three-dimensional (3D) image is converted into a planar two-dimensional (2D) image when a difference between the two values exceeds a predetermined limit, preventing the driver from feeling dizzy. Therefore, it is possible to increase marketability or driving safety.

The effects of the apparatus according to an exemplary embodiment of the present invention will now be described.

According to an exemplary embodiment of the present invention, it is possible to prevent a user riding in a vehicle from experiencing a crosstalk phenomenon upon utilizing a display apparatus.

Furthermore, according to an exemplary embodiment of the present invention, a driver of a vehicle may receive a three-dimensional image or a two-dimensional image having a suppressed crosstalk phenomenon through a display apparatus. Therefore, it is possible to reduce inconvenience or discomfort (e.g., dizziness) of the driver while driving and to achieve driving safety.

Furthermore, according to an exemplary embodiment of the present invention, since it is possible to selectively provide a three-dimensional image or a two-dimensional image according to a user who utilizes a display apparatus mounted in a vehicle, it is possible to increase satisfaction of a driver or passengers of the vehicle and to improve marketability and convenience of the vehicle.

The present invention may be implemented as code which may be written to a computer-readable recording medium and can thus be read by a computer. Examples of the computer-readable recording medium include a hard disk drive (HDD), a solid state drive (SSD), a silicon disk drive (SDD), a ROM, a RAM, a CD-ROM, a magnetic tape, a floppy disk, and optical data storage.

The computer readable recording medium can also be distributed over network coupled computer systems so that the computer readable code is stored and executed in a distributed fashion. Also, functional programs, code, and code segments for accomplishing the present invention may be easily construed by programmers skilled in the art to which the present invention pertains.

Those skilled in the art will appreciate that the present invention may be conducted in other specific ways than those set forth herein without departing from the spirit and essential characteristics of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a display apparatus, the method comprising:
generating, by a camera apparatus, a user image as information on a user sitting on a seat corresponding to the display apparatus;
extracting, by position determination device connected to the camera apparatus, a midpoint between two eyes of the user from the user image generated by the camera apparatus and monitoring a position of the midpoint; and changing, by a controller connected to the position determination device and the display apparatus, an output mode or an output area of the display apparatus in correspondence with the monitored position of the midpoint extracted by the position determination device, wherein the monitoring of the position of the midpoint includes:

recognizing a contour of a face of the user from the user image;

recognizing the two eyes in the contour; and monitoring the position of the midpoint between the two eyes, wherein the monitoring of the position of the midpoint further includes estimating the midpoint from data on the user using the contour when the two eyes are not recognized, wherein when the estimated midpoint is in an area having at least a predetermined confidence level, a first mode of the output mode for outputting a stereoscopic three-dimensional image, and wherein when the estimated midpoint is in an area having a confidence level lower than the predetermined confidence level, a second mode of the output mode for outputting a planar two-dimensional image is operated.

2. The method according to claim 1, wherein the monitoring of the position of the midpoint between the two eyes includes:

setting a first point and a second point at positions of the two eyes closest to each other; and setting an intermediate point between the first point and the second point as the midpoint.

3. The method according to claim 1, wherein the monitoring of the position of the midpoint between the two eyes includes:

recognizing first and second end portions of each of the two eyes;

setting an intermediate point between the first and second end portions of each of the two eyes as a first point and a second point; and setting an intermediate point between the first point and the second point as the midpoint.

4. The method according to claim 1, wherein the monitoring of the position of the midpoint further includes monitoring a tilt of an axis connecting the two eyes.

5. The method according to claim 1, wherein the changing of the output mode or the output area of the display apparatus includes:

comparing a current position with a previous position of the midpoint to determine a position change value; and adjusting a value of a polarization filter of the display apparatus in correspondence with the position change value.

6. The method according to claim 5, wherein the display apparatus outputs two different images, and wherein the polarization filter respectively transmits the two images to the two eyes of the user.

7. The method according to claim 6, wherein the changing of the output mode or the output area of the display apparatus includes:

the polarization filter blocking one of the two images when the current position is outside of a predetermined range; and the polarization filter respectively transmitting the two images to the two eyes of the user when the current position is within the predetermined range.

8. The method according to claim 7, wherein the predetermined range is individually set with respect to a horizontal direction, a vertical direction and a rotation direction of a predetermined point.

9. The method according to claim 1, wherein the output mode includes a first mode for outputting a stereoscopic three-dimensional image and a second mode for outputting a planar two-dimensional image, and wherein the first mode and the second mode are automatically switched in correspondence with the position of the midpoint.

10. An apparatus for controlling a display apparatus, tie apparatus comprising:

a camera apparatus configured for generating a user image of a user sitting on a seat corresponding to the display apparatus;

a position determination device connected to the camera device and configured for extracting a midpoint between two eyes of the user from the user image generated by the camera apparatus and monitoring a position of the midpoint; and a controller connected to the position determination device and configured for changing an output mode or an output area of the display apparatus in correspondence with the monitored position of the midpoint extracted by the position determination device, wherein the position determination device recognizes a contour of a face of the user from the user image, recognizes the two eyes in the contour, and monitors the position of the midpoint between the two eyes, wherein the position determination device estimates the midpoint from data on the user using the contour when the two eyes are not recognized, wherein when the estimated midpoint is in an area having at least a predetermined confidence level, a first mode of the output mode for outputting a stereoscopic three-dimensional image is operated, and wherein when the estimated midpoint is in an area having a confidence level lower than the predetermined confidence level, a second mode of the output mode for outputting a planar two-dimensional image is operated.

11. The apparatus according to claim 10, wherein the camera apparatus is disposed in a center area of the display apparatus in a left-and-right direction thereof.

12. The apparatus according to claim 10, wherein the position determination device:

sets a first point and a second point at positions of the two eyes closest to each other; and sets an intermediate point between the first point and the second point as the midpoint.

13. The apparatus according to claim 10, wherein the position determination device:

recognizes first and second end portions of each of the two eyes;

sets an intermediate point between first and second end portions of each of the two eyes as a first point and a second point; and sets an intermediate point between the first point and the second point as the midpoint.

14. The apparatus according to claim 10, wherein the position determination device monitors a tilt of an axis connecting the two eyes.

15. The apparatus according to claim 10, wherein the controller:
  is configured to compare a current position with a previous position of the midpoint to determine a position change value; and
  is configured to adjust a value of a polarization filter of the display apparatus in correspondence with the position change value.

16. The apparatus according to claim 15,
  wherein the display apparatus outputs two different images, and
  wherein the polarization filter respectively transmits the two images to the two eyes of the user.

17. The apparatus according to claim 16, wherein the controller is configured to perform control such that:
  the polarization filter blocks one of the two images when the current position is outside of a predetermined range; and
  the polarization filter respectively transmits the two images to the two eyes of the user when the current position is within the predetermined range.

18. The apparatus according to claim 10, wherein the output mode includes a first mode for outputting a stereoscopic three-dimensional image and a second mode for outputting a planar two-dimensional image.

19. The apparatus according to claim 18, wherein the controller automatically switches between the first mode and the second mode in correspondence with the position of the midpoint.

20. The apparatus according to claim 18,
  wherein the user image is generated through a camera disposed in a multimedia device or a navigation device, and
  wherein the camera operates when a seat belt of the seat is fastened or upon determining that the user is present through a pressure sensor disposed in the seat.

* * * * *